United States Patent [19]

Brock et al.

[11] 4,375,657
[45] Mar. 1, 1983

[54] MAGNETIC HEAD ASSEMBLY

[76] Inventors: George W. Brock, 27472 Altamount Rd., Los Altos Hills, Calif. 94022; Robert N. Hyland, 4020 N. Holster Dr., Tucson, Ariz. 85715; Edward J. Pawlowski, 7022 E. Calle Cerce, Tucson, Ariz. 85715; Frank B. Shelledy, 3640 N. Allwood Pl., Tucson, Ariz. 85715

[21] Appl. No.: 203,282

[22] Filed: Nov. 3, 1980

[51] Int. Cl.³ ............................ G11B 5/22; G11B 5/20
[52] U.S. Cl. ...................................... 360/125; 360/119; 360/123
[58] Field of Search ............... 360/126, 123, 125, 127, 360/119–120

[56] References Cited

U.S. PATENT DOCUMENTS

| 3,829,896 | 8/1974 | Brock et al. | 360/125 |
| 4,127,884 | 11/1978 | Nouchi et al. | 360/119 |
| 4,190,872 | 2/1980 | Jones et al. | 360/125 |
| 4,219,854 | 8/1980 | Church et al. | 360/125 |
| 4,219,855 | 8/1980 | Jones | 360/125 |
| 4,241,367 | 12/1980 | Nomura et al. | 360/123 |
| 4,281,357 | 7/1981 | Lee | 360/125 |

Primary Examiner—Alfred H. Eddleman
Attorney, Agent, or Firm—Nathan N. Kallman

[57] ABSTRACT

A magnetic head assembly useful as a write head is formed with a ferrite substrate, having a recessed channel on one surface in which a conductive coil is deposited, and a ferrite closure having a planar surface that is joined to the substrate surface to establish a transducing gap and to enclose the recessed coil. In operation, pulsed write current is applied to the write head and a significant reduction in Joule heating is realized. A low resistance substrate is employed to provide a high saturation flux density.

5 Claims, 2 Drawing Figures

MAGNETIC HEAD ASSEMBLY

DESCRIPTION

TECHNICAL FIELD

This invention relates to an improved magnetic head assembly employing ferrite pole pieces and thin film conductors.

An object of this invention is to provide a magnetic head assembly having a simplified and compact structure.

Another object of this invention is to provide a magnetic head assembly that achieves increased write efficiency.

Another object is to provide a magnetic head assembly that affords the use of pulsed write current.

A further object of this invention is to provide a magnetic head assembly that achieves a reduction of Joule heating.

A still further object of this invention is to provide a magnetic head assembly that employs a low resistance substrate so as to realize a high saturation flux density.

BACKGROUND ART

Conventional prior art magnetic write heads use ferrite material as the magnetic yokes or pole pieces. With the advent of thin film technology, it has been found to be advantageous to deposit planar conductors, preferably on the surface of one of the ferrite yokes that will serve as a substrate. The planar construction avoids crossover of conductor lines and the requirements for additional insulation. An additional problem found with magnetic heads of this type is the Joule heating ($I^2R$) in the gap formed between the ferrite yokes adjacent to the conductors. This heating leads to distortion problems of the magnetic head and the magnetic medium, which may be an oxide recording tape. One solution was to increase the number of conductive turns and to increase the cross-sectional area of the turns or windings to decrease resistance. However, the increase in cross-section of the windings is limited for an optimum configuration, because winding thickness is limited by gap length. Also, the winding should be close to the transducing gap for the most effective use of ampere turns in generating the write flux.

It has been proposed to provide a ferrite type head in which the ferrite substrate is grooved and a bias conductor is placed in the groove. The groove is then filled with a glass and lapped back to form a planar surface on which a write element conductor is deposited. However, such a structure requires the use of biased write operation, which is more complicated and expensive than the use of pulsed write current.

BRIEF DESCRIPTION OF THE DRAWINGS

The invention will be described with reference to the drawing in which.

DISCLOSURE OF THE INVENTION

Figure 1:
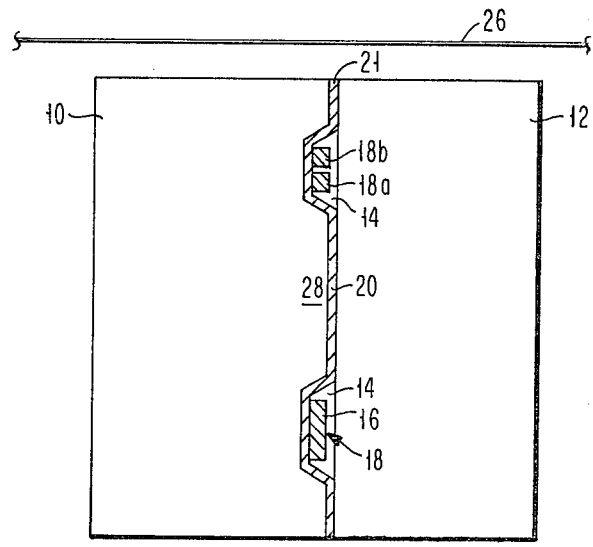
FIG. 1 is a cross-sectional side view of the magnetic head assembly of this invention.
Figure 2:
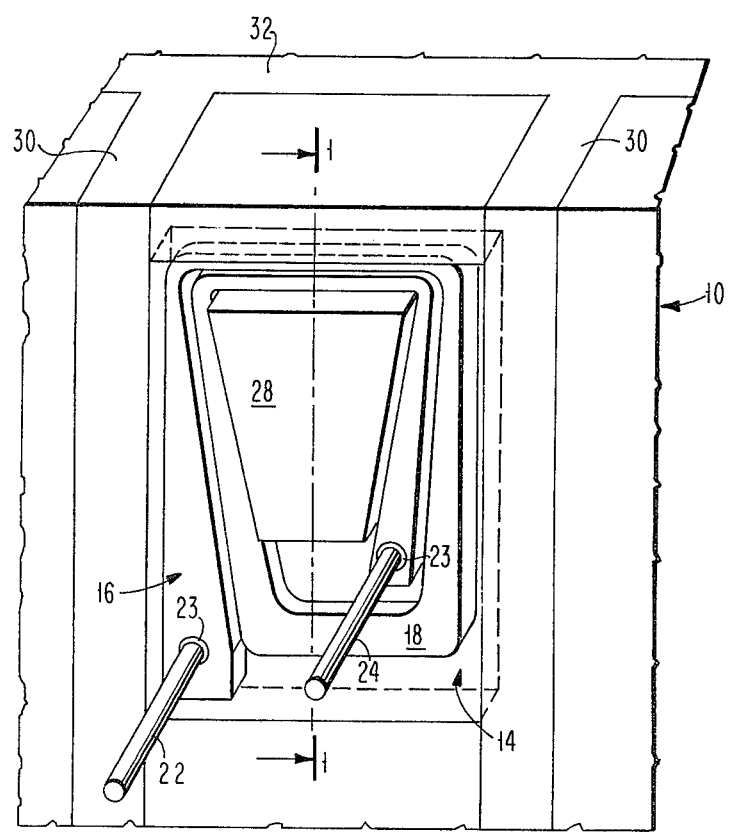
FIG. 2 is an isometric front view of the ferrite substrate of the head assembly, made in accordance with this invention.

With reference to the drawing, a magnetic head assembly comprises a ferrite substrate 10 and a ferrite closure section 12. The ferrite substrate 10 is configured with a recessed channel 14 in which a thin film conductive copper coil 16 of two turns 18a, 18b, is deposited, by sputtering, plating or vacuum deposition, for example. A thin film insulating layer 20, which may be $Al_2O_3$, is deposited between the coil 16 and the recessed surfaces of the channel 14, and on the surfaces of the substrate that are not recessed. The insulating layer 20 establishes the transducing gap 21, which interacts to transduce signals registered on a magnetic medium 26 adjacent to the gap at the effective transducing surface of the head assembly. The thickness of the layer 20 determines the length of the gap 21. To transmit the write signals for recording on the magnetic medium 26, which may be a magnetic tape, conductive leads 22, 24 are connected to the coil 16 by studs 23.

A back gap portion 28, which provides a closed path for the magnetic flux, is formed in the shape of a trapezoidal land that is encompassed by the channel 14 and the thin film coil 16. The back gap portion 28 provides a major mating surface for the ferrite closure section 12, and prevents bowing of the ferrite section 12 when joined to the substrate 10. The ferrite closure section 12 is joined to the back gap surface and the nonrecessed surface portions of the substrate 10 by a very thin layer of epoxy for example, to provide a closure for the head assembly.

Layers of glass 30 and 32 are provided to isolate the magnetic flux to the region of the conductor loop 18. The mold assembly may be made with multiple elements for multiple data tracks, such as found in present day tape machines. In the case of a multi-element head assembly consisting of like elements, the uniformly spaced parallel glass layers 30 serve to separate the head elements and to define the width of the data tracks being recorded, and the layer of glass 30 prevents element cross-talk between tracks.

During the manufacture of a preferred embodiment of the magnetic write head assembly of this invention, a block of manganese-zinc ferrite is shaped and lapped to desired dimensions. By the process of photolithography and reactive ion etching, an annular type channel 14 is formed and recessed into the ferrite block which serves as the substrate 10. The recess of the channel has a depth of about 50 to 200 microinches. An $Al_2O_3$ insulating layer 20 is then deposited across the nonplanar surfaces of the ferrite substrate 10 covering a back gap portion, the recessed surfaces of the channel 14, and the nonrecessed surfaces of the ferrite substrate. A conductive copper coil 24 is then vapor deposited as a thin film layer within the channel 14 onto the insulating layer 20. A second ferrite block 12 is then joined to the substrate 10 to serve as a closure for the head assembly.

In operation, the head assembly receives a pulsed write signal. No bias conductor is needed because bias current is not used. Pulled current substantially reduces the heat generated. Also, since the thickness or cross-section of the conductive coil may be increased within the recessed channel, the electrical resistance R is decreased, thereby reducing $I^2R$ loss. In this way, Joule heating of the head may be controlled, and distortion of the magnetic tape and head due to thermal effects is minimized.

By virtue of the configuration disclosed herein, the thin film conductive coil is not in direct contact with the ferrite substrate or ferrite closures. Therefore, a conductive ferrite material of low resistivity, such as manganese-zinc ferrite may be used. This material has a higher saturation magnetization than conventional ferrites of relatively high electrical resistivity, and thus an improved write field is obtained at the transducing gap. The positioning of the deposited coil closely adjacent to the transducing gap improves the strength of the write signal. The planar deposited coil provides a smaller flux path with less signal loss than would be achieved in a conventional wound structure. The problem of crossover of conductor lines is alleviated.

The use of photolithography, together with reactive ion etching or ion milling to form the channel for the deposited coil, results in a precise relation and geometry of the channel and coil relative to the transducing gap and the head assembly. These techniques are not restricted to processing simple surfaces, as found with conventional grinding, slicing and slitting techniques, but may apply to shaping various geometrical patterns, such as the recessed channel of the head assembly disclosed. Also, it should be noted that there is no need to etch the $Al_2O_3$ insulating layer, once deposited, as required by prior art head assemblies.

In an alternative embodiment, a spiral winding of conductors is provided within the gap, separated by ceramic insulators and connected through via holes etched in the insulators. The total integrated thickness of the winding conductors and insulators is less than the recessed channel 14.

Also, the glass separators 30 and 32 may be eliminated from the ferrite substrate, and glass separators may be provided in a similar closed geometric relationship on the ferrite closure yoke.

What is claimed is:
1. A ferrite magnetic head assembly comprising:
    a ferrite magnetic substrate having a configured surface;
    a recessed channel formed on said configured surface of said substrate;
    a conductive thin film coil disposed in said channel;
    a rectangular ferrite magnetic closure section having a planar surface coextensively contiguous with said configured surface for engaging said configured surface and for enclosing said conductive coil; and
    an insulating layer deposited on said configured surface and between said coil and said configured surface for providing a transducing gap.
2. A ferrite magnetic head assembly as in claim 1, wherein said substrate and said closure section serve as pole pieces to define a transducing gap therebetween.
3. A ferrite magnetic head assembly as in claim 1, wherein said insulating layer determines the length of said transducing gap.
4. A ferrite magnetic head assembly as in claim 1, including conductive studs attached to the ends of said conductive coil, and electrical leads attached to said studs for conducting signals to and from said head assembly.
5. A ferrite magnetic head assembly as in claim 1, including a back gap portion delineated by said recessed channel for providing a bearing surface for said closure section.

* * * * *